United States Patent

Lynes et al.

[15] 3,699,540

[45] Oct. 17, 1972

[54] TWO-TERMINAL TRANSISTOR MEMORY UTILIZING COLLECTOR-BASE AVALANCHE BREAKDOWN

[72] Inventors: Dennis Joseph Lynes, Madison; Jerry Mar, Scotch Plains, both of N.J.

[73] Assignee: Bell Telephone Laboratories, Incorporated, Murray Hill, N.J.

[22] Filed: Dec. 31, 1970

[21] Appl. No.: 103,169

[52] U.S. Cl. ..............340/173 R, 307/238, 307/280, 307/283

[51] Int. Cl. ..........................................G11c 11/40

[58] Field of Search...340/173 R; 307/238, 280, 283, 307/300, 302

[56] References Cited

UNITED STATES PATENTS

| | | | |
|---|---|---|---|
| 2,991,374 | 7/1961 | De Mirande | 307/300 X |
| 3,001,089 | 9/1961 | Tulp | 307/280 X |
| 3,373,295 | 3/1968 | Lambert | 340/173 |

*Primary Examiner*—Malcolm A. Morrison
*Assistant Examiner*—David H. Malzahn
*Attorney*—R. J. Guenther and Arthur J. Torsiglieri

[57] ABSTRACT

A semiconductor memory cell containing a single transistor having an uncontacted base is operated as a two-terminal device with a voltage pulse circuit coupled to the collector and a conduction detector coupled to the emitter. Bit information is written into the cell by setting the potential of the base to one of two values, which represent respectively a "1" and a "0." A "1" is written into the cell by applying a positive polarity voltage pulse to the collector of sufficient amplitude to bias the collector-base junction to avalanche breakdown and to forward-bias the emitter-base junction, thereby causing transistor conduction. To read out information previously stored in the cell and to write a "0" into the cell, a positive polarity voltage pulse is applied to the collector; the positive pulse is of insufficient amplitude to bias the collector-base junction to avalanche breakdown.

16 Claims, 3 Drawing Figures

INVENTORS D. J. LYNES
J. MAR
BY
Robert B. Anderson
ATTORNEY

TWO-TERMINAL TRANSISTOR MEMORY UTILIZING COLLECTOR-BASE AVALANCHE BREAKDOWN

BACKGROUND OF THE INVENTION

1. Field of the Invention

This invention relates to semiconductor memory apparatus which utilizes a single two-terminal transistor as a component of large information capacity semiconductor memories.

2. Description of the Prior Art

In computers and related applications there exists a need for large information capacity semiconductor memories in which information can be temporarily stored and read out within a useful period of time. To meet such requirements, it is necessary that the basic memory cell be of a sufficiently simple structure to permit a relatively large number to be fabricated and interconnected on a single monolithic integrated circuit chip.

To this end, prior art memory cells have used charge storage diodes for retaining information bits. One serious disadvantage of such memory cells is that the maximum storage time is limited to the minority carrier lifetime of the diodes used. Another disadvantage is that, as the physical size of the diodes and the amount of write current decreases, the magnitude of the stored charge which serves as the output signal decreases, thereby necessitating sensitive amplifiers to detect the small current differences between a stored "1" and "0."

In copending application of S. G. Waaben, Ser. No. 864,705, filed Oct. 8, 1969, now U.S. Pat. No. 3,626,389, in which there is a common assignee to this invention, the storage time has been extended through the use of two serially connected diodes which have different minority carrier lifetimes.

In copending application of M. Feldman and G. L. Heiter, Ser. No. 46,646, filed June 16, 1970, a light activated memory cell is described which utilizes a single transistor having an uncontacted photosensitive base. Signal light received over a period of time on the photosensitive base causes a build up of charge on the base which flows into the emitter-base junction when the transistor is turned on and gives rise to a collector current that is beta times the light signal created base current. This amplification of the output signal is very desirable; however, in many applications it is not practical to use any other input signal than an electrical one that is physically connected to the cell.

One solution to this problem is the use of a transistor having a contacted base, collector, and emitter. This solution works well for a single cell but is impractical to implement in a large memory because the making of three electrical contacts to each memory cell unduly increases the size of the integrated circuit chip and the complexity of the fabrication process.

The foregoing makes it clear that it is desirable to provide a practical two-terminal memory cell having transistor amplification of the signal, a storage time longer than the minority carrier lifetime and an electrical input wired to the cell, but to date no such device has been built.

OBJECTS OF THE INVENTION

It is an object of this invention to provide a semiconductor memory cell with increased storage time.

It is another object of this invention to provide a memory cell capable of use over wide voltage margins.

It is still another object of this invention to provide a memory cell having a high degree of detection sensitivity between a "1" and a "0."

It is a further object of this invention to provide a two-terminal memory cell which meets the above-mentioned objectives, is easily fabricated using standard integrated circuit techniques, and consists of only a single transistor.

It is a still further object of this invention to provide a relatively large capacity semiconductor memory using interconnected memory cells each meeting the above-mentioned objectives.

SUMMARY OF THE INVENTION

These and other objects of the invention are attained in an illustrative embodiment thereof comprising a memory cell consisting of only a single transistor containing a collector coupled to a voltage pulse circuit, an emitter coupled to a conduction detector circuit, and an uncontacted base whose floating potential is set to one of two values, which represent respectively a stored "1" and "0."

A "1" is written into the cell by sufficiently positively pulsing the collector potential to bias the collector-base junction to avalanche breakdown and to forward-bias the emitter-base junction in order to cause transistor conduction. The useful storage time of information written into the cell is determined by the leakage of charge from the base into relatively high impedance reversed-biased semiconductor junctions. To read out information previously stored within the cell and write a "0" into the cell, a positive polarity voltage pulse of insufficient amplitude to bias the collector-base junction to avalanche breakdown is applied to the collector.

The simplicity of the structure of this memory cell, the two-terminal operation, the relatively long retention period of stored information, and the ease of fabrication using standard integrated circuit techniques make this memory cell well suited for use in large capacity integrated circuit memories.

These and other objects, features and advantages of the invention will be better understood from a consideration of the following detailed description, taken in conjunction with the accompanying drawing.

DETAILED DESCRIPTION

Figure 1:
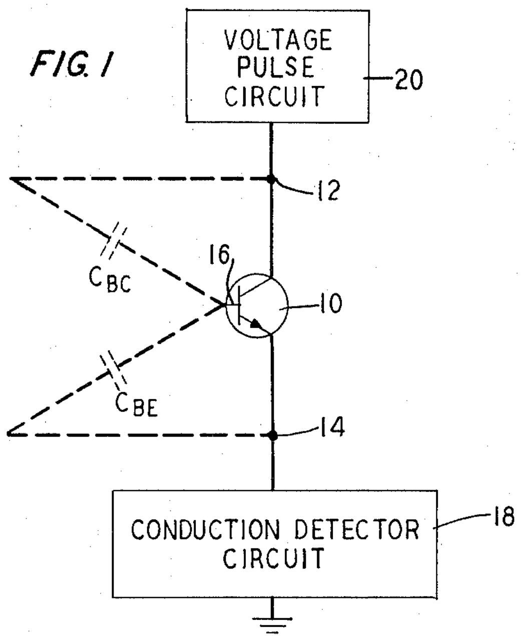
FIG. 1 illustrates a schematic diagram of a two-terminal NPN transistor memory cell in accordance with this invention.

Referring now to FIG. 1, there is shown an illustrative embodiment of the invention comprising an NPN transistor 10 containing a collector terminal 12, an emitter terminal 14, and an uncontacted base 16. A circuit 18 is connected to the emitter terminal 14 which acts as a conduction detector and a low impedance path to ground potential. A voltage pulse circuit 20 is connected to the collector terminal 12. The capacitances $C_{BC}$ and $C_{BE}$ associated with the collector-base junction and the base-emitter junction, respectively, are shown external to the transistor in order to simplify the description of the mode of operation which appears below. These capacitances serve as low impedance ac paths between the collector, base, and emitter.

The potential of the base 16 floats and is electrically set to one of two values, which represent, respectively, the storage of a "1" and "0" in the cell, by applying a positive polarity voltage pulse to the collector terminal 12.

A "1" is stored in a cell containing a "0" by applying to the collector terminal 12, a positive polarity write voltage pulse of sufficient amplitude to bias the collector-base junction to avalanche breakdown and to raise the base potential sufficiently to forward-bias the emitter-base junction.

The broken down collector-base junction is a low impedance path between the voltage pulse circuit and the base. Current flowing to the base gives rise to transistor conduction. The termination of the write pulse causes the collector-base junction to cease operating in avalanche breakdown, thereby cutting off the supply of base current and causing transistor conduction to cease. The base potential starts to decrease toward the "0" potential but is inhibited from completely doing so by the flow of holes into the base which cause the base to assume a more positive potential than the "0" potential. The resulting potential is defined as the "1" potential. The reason for the presence of holes within the transistor after conduction ceases will be discussed later.

In order to detect information stored in the cell, a positive polarity read voltage pulse of insufficient amplitude to bias the collector-base junction to avalanche breakdown, is applied to the collector by the voltage pulse circuit. If a "1" is stored in the cell, the base potential rises and attains a value such that the emitter-base junction is forward-biased and transient transistor conduction occurs. If a "0" is stored in the cell, the base potential rises but fails to attain a value sufficient to allow transistor conduction. At the termination of the read pulse the base assumes the "0" potential.

In operation, to write a "1" on a base containing a "0,"an approximately ground based write voltage pulse having a positive polarity is applied to the collector terminal 12 by the voltage pulse circuit 20. The leading edge of the write pulse causes the base potential to rise with respect to the emitter terminal potential, such that the emitter-base junction becomes forward-biased and limits any further increase in the base potential. As the leading edge of the write pulse reaches its maximum amplitude, the collector-base junction is biased to avalanche breakdown and acts as a low impedance path between the collector terminal and the uncontacted base. The base can now receive current from the voltage pulse source via the broken down collector-base junction. Transistor conduction occurs since there is a source of base current and the emitter-base junction is forward-biased.

The trailing edge of the write pulse rapidly cuts off the avalanche breakdown operation of the collector-base junction, thereby cutting off the supply of the base current and therefore rapidly terminating transistor conduction.

The rapid termination of transistor conduction causes an equal number of electrons and holes to be temporarily trapped within the transistor. The electrons, being majority carriers in the N-type semiconductor collector, traverse the collector at approximately the speed of light and exit the transistor via the collector contact into the voltage pulse circuit. The holes, being minority carriers in the N-type semiconductor emitter, are unable to quickly traverse the emitter and exit the transistor via the emitter terminal into the conduction detector circuit. They must first recombine with electrons in order to effectively exit the transistor. Some number of holes are able to exit the transistor due to leakage. The effective lifetime of the holes existing in the transistor after conduction closes, is a function of the recombination and leakage rates.

The trailing edge of the write pulse, in addition to terminating transistor conduction, causes the base potential to fall toward the "0" or to a more negative potential. The decrease in base potential is partially negated by the flow of holes into the base that cause the base to assume a potential more positive than the "0" potential. This resulting potential is defined as the "1" potential.

It is necessary for the fall time of the trailing edge of the write pulse to be equal to or less than the effective lifetime of the holes in order for them to be effective in negating the effect of the trailing edge of the write pulse on the base potential. In a preferred embodiment, the effective lifetime of the holes is approximately 50 nanoseconds and the fall time of the trailing edge of the write pulse is approximately 10 nanoseconds.

In order to detect the base potential and thereby determine the stored information in the cell, an approximately ground based read voltage pulse of positive polarity and insufficient amplitude to bias the collector-base junction to avalanche breakdown is applied to the collector terminal by the voltage pulse circuit. The leading edge of the read pulse causes the base potential to rise sufficiently with respect to the emitter terminal potential to forward-bias the emitter-base junction sufficiently to allow transistor conduction if, and only if, the base was previously at the "1" potential. Transient transistor conduction upon the application of a read pulse to the memory cell is interpreted as a "1," whereas nontransistor conduction is interpreted as a "0."

The pulse width of the read pulse is such that transient transistor conduction, which occurs if the cell was previously at the "1" potential, ceases prior to the start of the trailing edge of the read pulse. Upon termination of the transient transistor conduction, the emitter-base junction is left forward-biased, but not sufficiently to permit conduction. The trailing edge of the read pulse then lowers the base potential to the "0" potential. Therefore, the reading out of a stored "1" from the cell causes the writing of a "0" into the cell.

If a read pulse is applied to a memory cell containing a stored "0," the leading edge of the pulse raises the base potential with respect to the emitter potential sufficiently to forward-bias the emitter-base junction but not sufficiently to allow transistor conduction. The trailing edge of the read pulse then lowers the base potential back to the "0" potential. It is, therefore, apparent that the reading out of a stored "1" or "0" from the cell causes the writing of a "0" into the cell.

If a read pulse is applied to a memory cell that contains a stored "0" some current flow due to the voltage change across the series combination of $C_{CB}$ and $C_{BE}$ is detected by the conduction detector voltage control source. The transistor does not conduct because the base potential does not become positive enough to cause the emitter-base junction to be sufficiently forward-biased to permit conduction. If $C_{BC} = C_{BE}$, then the induced current through them is directly proportional to $C_{BC}/2$. This current is the output signal which represents a stored "0."

If a read pulse is applied to a memory cell that contains a stored "1," an initial current identical to that corresponding to a stored "0" will be detected. In response to the read pulse the base potential rapidly increases so as to forward-bias the emitter-base junction. The forward-biased emitter-base junction is a low impedance shunt across $C_{BE}$ which limits any further change in potential across $C_{BE}$. The current now induced in $C_{BC}$ is directly proportional to $C_{BC}$, and not to $C_{BC}/2$, as is the case for a stored "0." This induced current in $C_{BC}$ flows into the low impedance emitter-base junction, is amplified by a factor of $\beta+1$ and is detected by the conduction detector circuit that is connected to the emitter. This current is the output signal which represents a stored "1."

The current detected for a stored "1" is, therefore, proportional to $C_{BC}$ $(\beta+1)$, as compared to a "0" current proportional only to $C_{BC}/2$. This means that the ratio of the output signal for a "1" to a "0" is approximately $2(\beta+1)$:1. A $\beta$ of even 9 results in a 20:1 difference between a "1" and "0" output signal.

If $C_{BC}$ is greater than $C_{BE}$, as is the case in many integrated circuit transistors, the current signal representative of a stored "0" is primarily determined by $C_{BE}$ while the current representative of a "1" level is primarily determined by $C_{BC}$ and the beta of the transistor. If $C_{BC} = 10\ C_{BE}$, the ratio of a "1" signal to "0" signal is $10(\beta+1)$:1. For a $\beta$ of nine this means a ratio of 100:1. Even if $C_{BC}$ is smaller than $C_{BE}$, there will still be a relatively large difference between the "1" and "0" output currents due to the $\beta+1$ multiplication of the base current.

In a preferred embodiment of the invention an NPN transistor having an uncontacted base is utilized as a two-terminal memory cell. The collector-base junction of the transistor has a breakdown potential of 9.3 volts. A ground based positive polarity voltage pulse having an amplitude of 10 volts is used as the write pulse. A ground based positive polarity voltage pulse having an amplitude of 5 volts is used as the read pulse. The "0" base potential is approximately −2.1 volts and the "1" base potential is approximately 0 volts.

Relatively large variations in pulse supply voltages can be tolerated with little effect on circuit performance. For example, a write pulse with an amplitude greater than 10 volts can be used with little effect to the value of the "1" base potential. This increased amplitude write pulse causes an increase in collector current that causes a greater amount of holes to be temporarily trapped in the transistor after conduction terminates. These additional holes negate the increased amplitude of the trailing edge of the write pulse and thereby maintain the value of "1" base potential at approximately 0 volts.

A read voltage pulse whose amplitude is greater than 5 volts, but smaller than 9.3 volts, causes the "0" base potential to be more negative than −2.1 volts; an amplitude of less than 5 volts but more than 2 volts causes the "0" potential to be more positive than −2.1 volts but less positive than 0 volts the "1" potential.

The conduction detector circuit acts as a low impedance path between the emitter and ground potential in addition to detecting current through the parasitic capacitances and the emitter. As current through the transistor seeks to increase in response to an increased amplitude write pulse, the potential drop across the conduction detector circuit increases, thereby raising the emitter potential with respect to the base potential. This reduces the forward-bias potential across the emitter-base junction limiting the amount of current that flows in the transistor.

As has been illustrated, the read operation causes a "0" to be stored in the cell. At the termination of the read operation the collector and emitter are at approximately ground potential and the base potential is approximately −2.1 volts, the "0" potential. The collector-base and emitter-base junctions are therefore reverse-biased and represent high impedance paths to charge stored on the base. If these reverse-biased junctions were of infinitely high impedance the charge stored in the base, which causes the base potential to be at −2.1 volts, would remain in the base indefinitely, and therefore the information stored in the cell could be read out at any later time. The impedances associated with the reverse-biased junctions, however, do not have infinitely high impedance and therefore charge stored on the base will leak into these reverse-biased junctions and the base potential will reach the same potential as the collector and emitter, 0 volts. If a stored "0" is not detected before the charge leaks from the base and raises the base potential to 0 volts, a "1" will be detected instead of a "0," since the "1" base potential corresponds to a base potential of 0 volts. Stored "1's" are never destroyed unless intentionally removed from the cell.

By using air insulated integrated circuit techniques, it is possible to construct a single memory cell, including wiring, in just one millionth of a square inch. One thousand and twenty-four memory cells can be fabricated and interconnected on a single integrated circuit chip having an area of approximately 0.1 square inch.

An advantage of this cell is that only one voltage pulse circuit, which supplies only positive polarity pulses, is needed.

Figure 2:
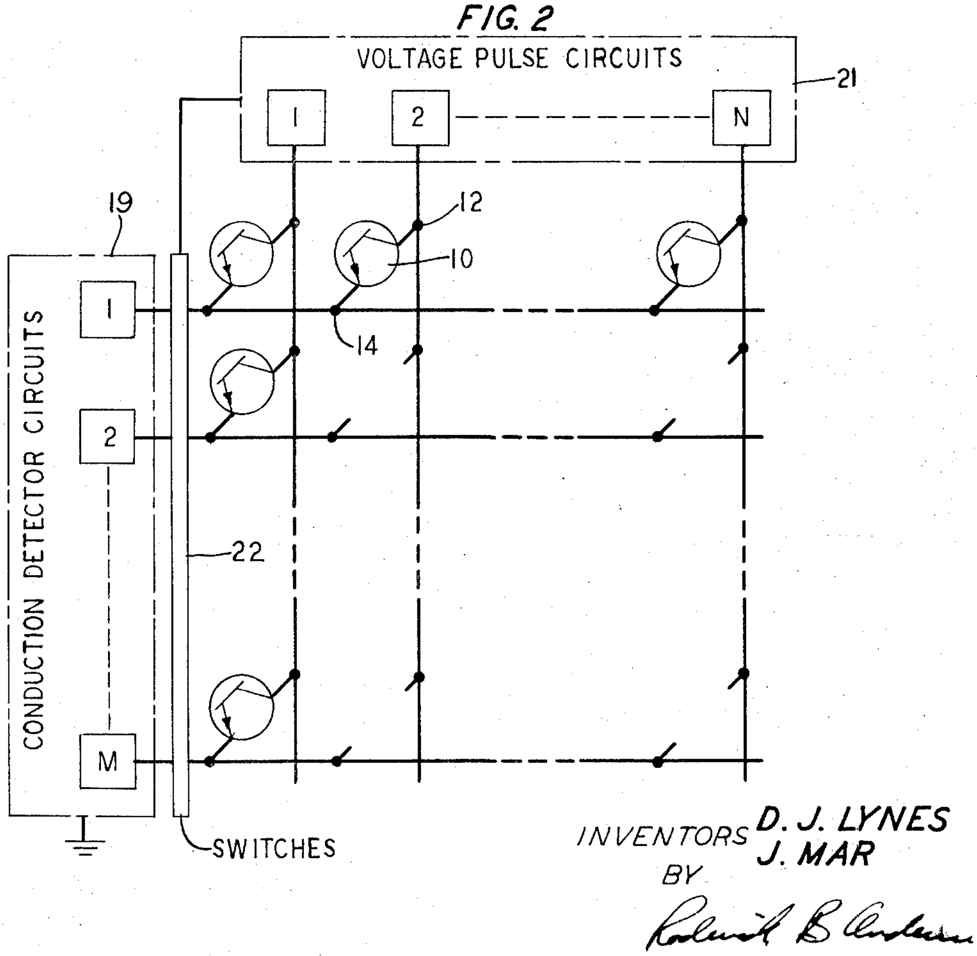
FIG. 2 illustrates a memory system formed using the NPN transistor memory cell of FIG. 1.

Referring now to FIG. 2 there is shown another illustrative embodiment of the invention comprising an array of NPN transistors 10 forming a bit organized memory. The array is arranged in M rows and N columns of individual NPN transistors which are interconnected to form a memory having MxN memory cells. All of the collector terminals 12, in a common column are interconnected; all of the emitter terminals 14 in a common row are interconnected. Voltage pulse circuits 21 are electrically connected to the common collector terminals 12. Circuits 19, which act as conduction detectors and low impedance paths to ground potential, are electrically connected to the common emitter terminals 14 through switches 22. The operation of each component cell of the multicell memory is the same as that of the single memory cell of FIG. 1.

In operation, to write a "1" into a preselected cell, an approximately ground based positive going write voltage pulse of sufficient amplitude to bias the collector-base junction to avalanche breakdown is applied to the column to which the cell is connected. All other columns are held at ground potential. The switch corresponding to the row connected to the preselected cell is closed; all other switches are left open.

To read out information stored in a preselected cell and write a "0" into the cell, the same procedure for writing a "1" into the cell is followed except that a voltage pulse of smaller amplitude than the write voltage pulse is used.

The above-mentioned write and read operations allow information to be written into or read out of a preselected cell without destroying information stored in all other cells of the memory array. This feature allows the memory to be used as a bit organized memory.

Figure 3:
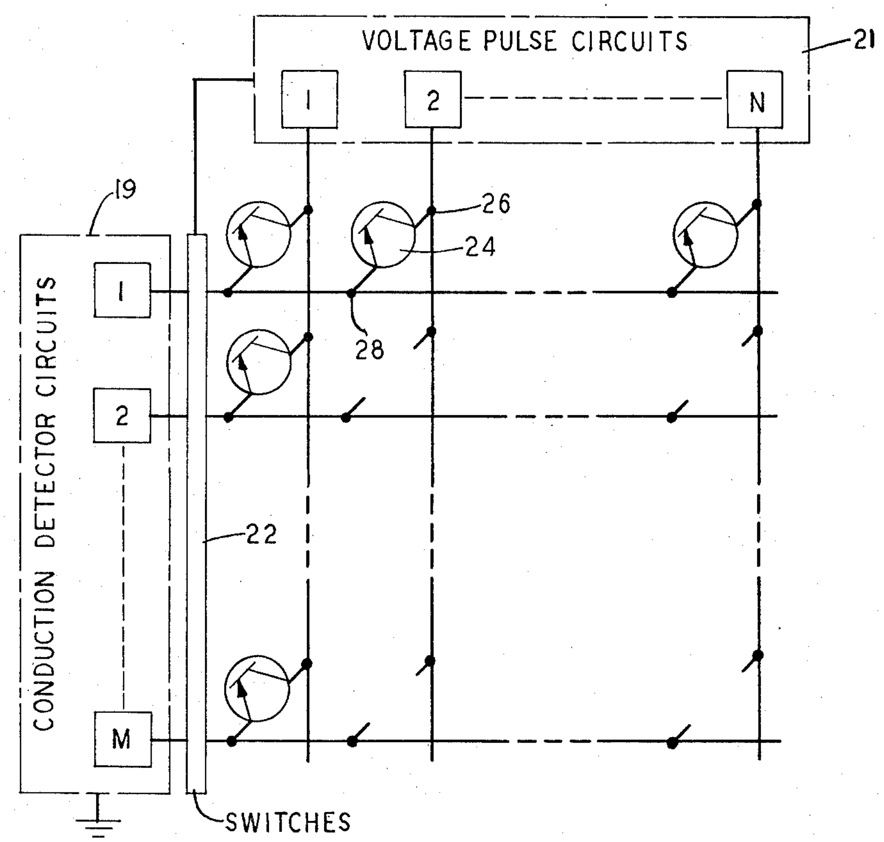
FIG. 3 illustrates another memory system formed using PNP transistor memory cells.

Referring now to FIG. 3 there is shown another illustrative embodiment of the invention comprising an array of PNP transistors 24 forming a bit organized memory. The array is arranged in M rows and N columns of individual PNP transistors which are interconnected to form a memory having MxN memory cells. All of the collector terminals 26 in a common column are interconnected; all of the emitter terminals 28 in a common row are interconnected. Voltage pulse circuits 21 are electrically connected to the common collector terminals 26. Circuits 19, which act as conduction detectors and low impedance paths to ground potential, are electrically connected to the common emitter terminals 28 through switches 22.

The operation of this memory is the same as that of the memory of FIG. 2 except that the polarities of the read and write voltage pulse must be reversed. The resulting "0" base potential is more positive than the "1" base potential. Electrons, which are temporarily trapped within the transistor following the termination of transistor conduction, flow into the base and cause the base to assume the "1" potential.

The embodiments described are intended to be illustrative of the principles of the invention. Various other modifications and embodiments may be made by those skilled in the art without departing from the spirit and scope of the invention. For example, the bit organized memory can be easily converted into a word organized memory.

We claim:

1. A semiconductor memory cell comprising:

a junction transistor having an uncontacted base, the potential of which floats at two values which represent, respectively, a "1" and "0" stored in the cell;

first means coupled to the transistor for forward-biasing the emitter-base junction and biasing the collector-base junction to avalanche breakdown to set the potential of the base to a first value which is defined as a "1;" and second means coupled to the transistor for first increasing and then decreasing the potential of the collector such that the potential of the base is set to a second value which is defined as a "0," and conduction occurs within the transistor if, and only if the base was initially at the "1" potential.

2. A semiconductor memory cell comprising:

a junction transistor having an uncontacted base, the potential of which floats at two different values which represent, respectively, the storage of a "1" and "0" in the cell;

a first circuit means coupled to the collector of said transistor for first increasing the potential of the collector from an initial value to a value sufficient to bias the collector-base junction to avalanche breakdown and to increase the potential of the base sufficiently to forward-bias the emitter-base junction, thereby causing transistor conduction, and then decreasing the collector potential to its initial value, whereby transistor conduction is terminated, leaving holes trapped within the transistor for a period of time, whereupon the base potential starts to return to the "0" potential but instead returns to a different potential defined as the "1" potential; and a second circuit means coupled to the collector for first increasing the collector potential from an initial value to a value sufficient to cause transient transistor conduction only if a "1" is stored in the cell, and then decreasing the potential of the collector to its initial value, whereby the base potential assumes the "0" potential.

3. The memory cell of claim 2 wherein said first and second means constitute part of a voltage pulse circuit adapted to supply voltage pulses of different amplitudes.

4. The memory cell of claim 2 wherein the time required to decrease the collector potential from the value sufficient to bias the collector-base to avalanche breakdown to its initial value is less than or equal to the period of time in which the holes exist in said transistor after conduction is terminated.

5. The memory cell of claim 2 further comprising a conduction detector circuit coupled to the emitter of the transistor.

6. The memory cell of claim 5 wherein the conduction detector circuit is coupled to a reference potential.

7. The memory cell of claim 6 wherein said conduction detector circuit is a low impedance connecting said emitter to said reference potential.

8. Semiconductor memory apparatus comprising:

a plurality of memory cells, each of which comprises an NPN junction transistor having an uncontacted base, the potential of which floats at two different values which represent, respectively, the storage of a "1" and "0" in the cell;

a first circuit means coupled to a preselected transistor cell for increasing the potential of the collector of said transistor from an initial value to a value sufficient to bias the collector-base junction to avalanche breakdown and to increase the potential of the base sufficiently to forward-bias the emitter-base junction, thereby causing transistor conduction, and then decreasing the potential of the collector to its initial value, whereby transistor conduction is terminated leaving holes trapped within the transistor for a period of time, whereupon the base starts to return to the "0" potential but instead returns to a different potential defined as the "1" potential;

a second circuit means coupled to the collector of a preselected transistor memory cell for first increasing the collector potential from an initial value to a value sufficient to cause transient transistor conduction only if a "1" is stored in the cell, and then lowering the potential of the collector to its initial value, whereby the base potential assumes the "0" potential; and a third means forming a plurality of conduction paths coupling said memory cells to said first and second means.

9. The apparatus of claim 8 wherein said first and second circuit means constitute part of a voltage pulse circuit adapted to supply voltage pulses of different amplitudes and polarities.

10. The apparatus of claim 8 wherein the time required to decrease the collector potential from the value sufficient to bias the collector-base to avalanche breakdown to its initial value is less than or equal to the period of time in which the holes exist in said preselected transistor cell after conduction is terminated.

11. The semiconductor memory apparatus of claim 8 further comprising conduction detector circuits and wherein the plurality of conduction paths which couple the memory cells to the first and second means also couple the memory cells to the conduction detection circuits.

12. The apparatus of claim 11 wherein the conduction detector circuits are coupled to a reference potential.

13. The apparatus of claim 9 wherein said conduction detector circuits are low impedances coupling said second emitters to said reference potential.

14. The apparatus of claim 13 further comprising electrically activated switches which couple said conduction detector circuits to said emitters, whereby a "1" or "0" can be stored in or read out of any preselected memory cell without destroying the information stored in any of the other memory cells of said semiconductor memory apparatus.

15. Semiconductor memory apparatus comprising:

a plurality of memory cells, each of which comprises a PNP junction transistor having an uncontacted base, the potential of which floats at two different values which represent, respectively, the storage of a "1" and "0" in the cell;

a first circuit means coupled to a preselected transistor cell for decreasing the potential of the collector of said transistor from an initial value to a value sufficient to bias the collector-base junction to avalanche breakdown and to decrease the potential of the base sufficiently to forward-bias the emitter-base junction, thereby causing transistor conduction, and then increasing the potential of the collector to its initial value, whereby transistor conduction is terminated leaving electrons trapped within the transistor for a period of time, whereupon the base starts to return to the "0" potential but instead returns to a different potential defined as the "1" potential;

a second circuit means coupled to the collector of a preselected transistor memory cell for first decreasing the collector potential from an initial value to a valve sufficient to cause transient transistor conduction only if a "1" is stored in the cell, and then increasing the potential of the collector to its initial value, whereby the base potential assumes the "0" potential; and a third means forming a plurality of conduction paths coupling said memory cells to said first and second means.

16. A method for performing a memory function utilizing at least one memory cell which comprises a junction transistor having an uncontacted base, the potential of which floats at two values which represent, respectively, a "1" and a "0" stored in the cell comprising the steps of:

writing a "1" into the cell by forward-biasing the emitter-base junction and biasing the collector-base junction to avalanche breakdown such that the base is set to a first potential defined as a "1;" and reading out information stored in the cell by increasing the potential of the collector sufficiently to cause conduction in the transistor if a "1" is stored in the cell and then decreasing the potential of the collector such that the base is set to a second potential defined as a "0."

* * * * *